United States Patent
Booch et al.

(10) Patent No.: US 11,074,510 B2
(45) Date of Patent: Jul. 27, 2021

(54) EMBODIED COGNITION PLATFORM FOR USE IN AND CONTROL OF A DEVICE

(71) Applicant: International Business Machines Corporation, Armonk, NY (US)

(72) Inventors: Ernest Grady Booch, Lahaina, HI (US); Raphael P. Chancey, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1179 days.

(21) Appl. No.: 15/451,112

(22) Filed: Mar. 6, 2017

(65) Prior Publication Data
US 2018/0253662 A1 Sep. 6, 2018

(51) Int. Cl.
*G06N 5/04* (2006.01)
*G06N 20/00* (2019.01)
*G06N 3/00* (2006.01)

(52) U.S. Cl.
CPC ............ *G06N 5/043* (2013.01); *G06N 20/00* (2019.01); *G06N 3/004* (2013.01); *G06N 3/008* (2013.01)

(58) Field of Classification Search
CPC ........ G06N 20/00; G06N 20/10; G06N 20/20; G06N 3/008; G06N 5/043
See application file for complete search history.

(56) References Cited

U.S. PATENT DOCUMENTS

| 6,353,814 B1 * | 3/2002 | Weng ................. G05B 13/0265 700/258 |
| 6,691,151 B1 * | 2/2004 | Cheyer .................. G06F 9/465 709/202 |

(Continued)

OTHER PUBLICATIONS

Sun, Q. et al. (2013). "A multi-agent-based intelligent sensor and actuator network design for smart house and home automation." Journal of Sensor and Actuator Networks 2.3 (2013): 557-588. (Year: 2013).*

(Continued)

*Primary Examiner* — Kamran Afshar
*Assistant Examiner* — Benjamin J Buss
(74) *Attorney, Agent, or Firm* — Ference & Associates LLC

(57) ABSTRACT

One embodiment provides an apparatus, including: a sensor subsystem comprising i) a plurality of sensors that collect information about the apparatus' immediate environment and ii) at least one agent that fuses and interprets the collected information; a model subsystem comprising i) a plurality of models, including a model for each of the apparatus' immediate environment, sentient beings, and the apparatus itself, the models receiving the collected information and storing other information and ii) at least one agent that uses the collected information and the stored other information to deduce information about the apparatus' immediate environment; an actuator subsystem comprising a plurality of actuators that interact with the apparatus' immediate environment based upon the collected information and the information deduced by the model subsystem; and an agency subsystem comprising a plurality of agents that carry out plans according to goals identifying at least one desired outcome in relation to the apparatus' immediate environment.

20 Claims, 9 Drawing Sheets

(56) References Cited

U.S. PATENT DOCUMENTS

| | | | | |
|---|---|---|---|---|
| 6,754,643 | B1* | 6/2004 | Goldsmith | G06N 20/00 706/14 |
| 8,484,146 | B2* | 7/2013 | Movellan | B25J 13/003 700/245 |
| 9,423,484 | B2* | 8/2016 | Aycock | G01S 3/7861 |
| 2002/0169733 | A1* | 11/2002 | Peters, II | B25J 9/163 706/45 |
| 2005/0149227 | A1* | 7/2005 | Peters, II | G05D 1/0274 700/245 |
| 2007/0050115 | A1* | 3/2007 | Discenzo | B66C 13/063 701/50 |
| 2009/0105879 | A1* | 4/2009 | Ng-Thow-Hing | G06N 5/043 700/245 |
| 2009/0254236 | A1* | 10/2009 | Peters, II | G05D 1/0246 701/28 |
| 2011/0161076 | A1* | 6/2011 | Davis | G06F 3/0488 704/231 |
| 2012/0129595 | A1* | 5/2012 | Kim | G06N 20/00 463/29 |
| 2013/0273968 | A1* | 10/2013 | Rhoads | H04W 4/50 455/556.1 |
| 2018/0114137 | A1* | 4/2018 | Ferreira Moreno | G06N 7/023 |
| 2018/0253662 | A1* | 9/2018 | Booch | G06N 5/043 |
| 2019/0291727 | A1* | 9/2019 | Shalev-Shwartz | G08G 1/163 |

OTHER PUBLICATIONS

Van Aart, C. (2005). "Five Capabilities Model." Organizational Principles for Multi-Agent Architectures (2005): 75-97. (Year: 2005).*

Kang, Y. et al. (2013). "Self-organizing cognitive models for virtual agents." International Workshop on Intelligent Virtual Agents. Springer, Berlin, Heidelberg, 2013. (Year: 2013).*

Hagras, H. et al. (2004.). "Creating an ambient-intelligence environment using embedded agents." IEEE Intelligent Systems 19.6 (2004): 12-20. (Year: 2004).*

Boada, M.J.L. et al. (2002). "Visual approach skill for a mobile robot using learning and fusion of simple skills." Robotics and Autonomous Systems 38.3-4 (2002): 157-170. (Year: 2002).*

Maes, P. (1993). "Modeling adaptive autonomous agents." Artificial life 1.1_2 (1993): 135-162. (Year: 1993).*

Merriam-Webster. Definition of "apparatus". 2020. (Year: 2020).*

Wikipedia. Sentience. Archived at archive.org Feb. 19, 2017. (Year: 2017).*

* cited by examiner

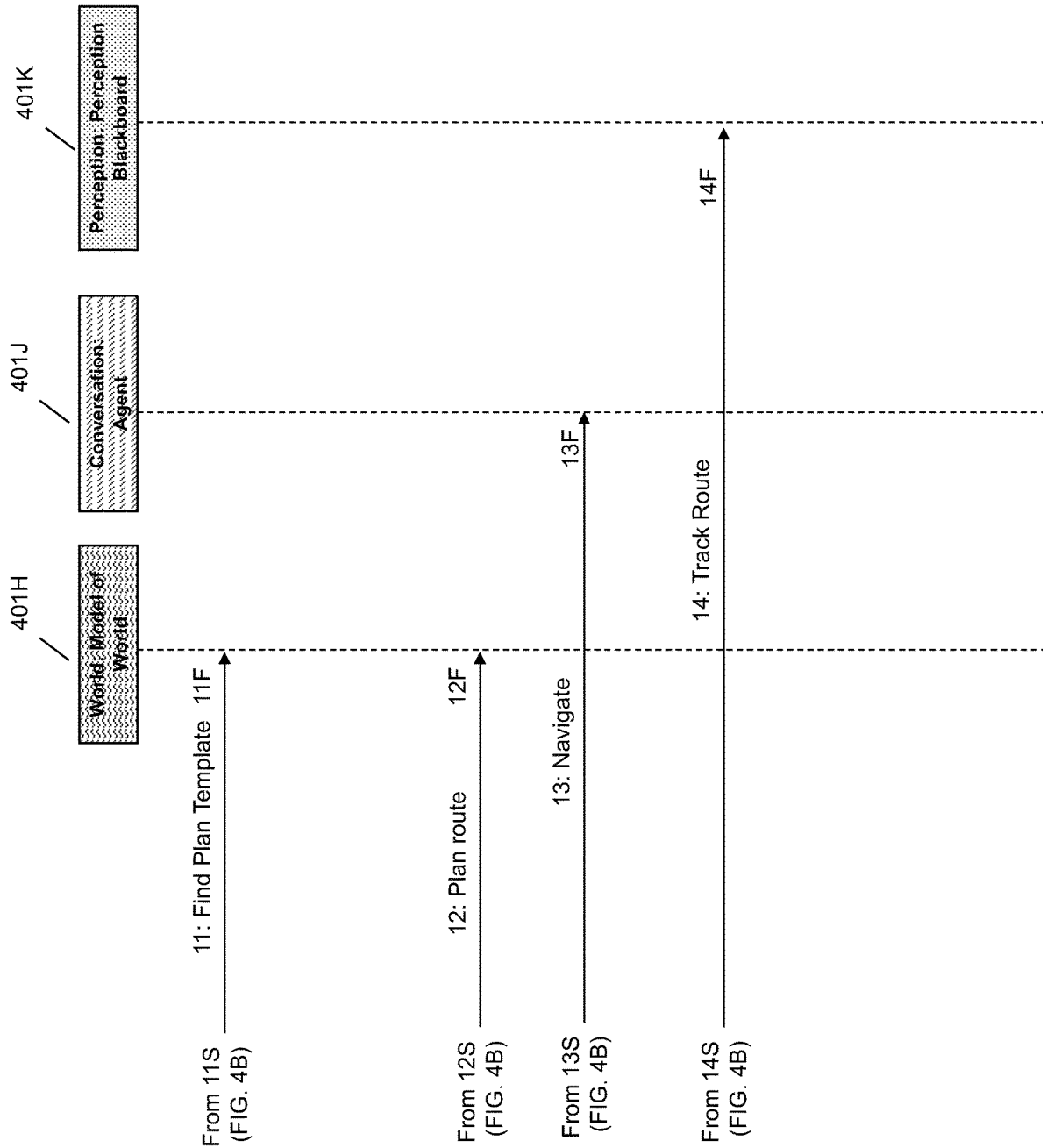

EMBODIED COGNITION PLATFORM FOR USE IN AND CONTROL OF A DEVICE

BACKGROUND

Cognition is the mental action or process of acquiring knowledge and understanding through though, experience, and senses. Human cognition includes processes such as problem solving, decision making, comprehension, common sense reasoning, and the like, and may rely on other human processes such as memory, attention, knowledge, and the like. Cognitive processes use existing knowledge and also generate new knowledge. Thus, programming or instilling cognition into a machine or apparatus is very difficult. Programming reasoning and the ability to react to different human interactions into a machine is complex due to the fact that machines are controlled mostly by rules, scripts, and programs which are very concrete with concrete results. On the other hand, the human mind and human cognition can be as abstract as they are concrete.

BRIEF SUMMARY

In summary, one aspect of the invention provides an apparatus, comprising: a sensor subsystem comprising i) a plurality of sensors that collect information about the apparatus' immediate environment and ii) at least one agent that fuses and interprets the collected information; a model subsystem comprising i) a plurality of models, including a model for each of the apparatus' immediate environment, sentient beings, and the apparatus itself, the models receiving the collected information and storing other information and ii) at least one agent that uses the collected information and the stored other information to deduce information about the apparatus' immediate environment; an actuator subsystem comprising a plurality of actuators that interact with the apparatus' immediate environment based upon the collected information and the information deduced by the model subsystem about the apparatus' immediate environment; and an agency subsystem comprising a plurality of agents that carry out plans according to goals identifying at least one desired outcome in relation to the apparatus' immediate environment, wherein the agency subsystem interacts with the sensor subsystem, model subsystem, and actuator subsystem; the plans operating by invoking a sequence of skills to achieve the goals, wherein each of the skills in the sequence represents at least one atomic outwardly observable behavior selected from the group consisting of: scripted behaviors, learned behaviors, and taught behaviors, and wherein the skills invoke reflexes comprising a closed loop behavior interacting with the plurality of actuators.

Another aspect of the invention provides a computer program product, comprising: a computer readable storage medium having computer readable program code embodied therewith, the computer readable program code executable by a processor and comprising: computer readable program code that collects, using a plurality of sensors of a sensor subsystem, information about an apparatus' immediate environment; computer readable program code that fuses and interprets, using at least one agent of the sensor subsystem, the collected information; computer readable program code that receives, at a plurality of models of a model subsystem, the collected information, wherein the plurality of models store other information; computer readable program code that, using the collected information and the stored other information, deduces, using at least one agent of the model subsystem, information about the apparatus' immediate environment; and computer readable program code that carries out, using a plurality of agents of an agency subsystem, plans according to goals identifying at least one desired outcome in relation to the apparatus' immediate environment; wherein the plans operate by invoking a plurality of skills, wherein each of the plurality of skills represents at least one behavior selected from the group consisting of: scripted behaviors, learned behaviors, and taught behaviors, wherein the skills invoke reflexes interacting with a plurality of actuators of an actuator subsystem, wherein the plurality of actuators interact with the environment.

An additional aspect of the invention provides a method, comprising: utilizing at least one processor to execute computer code that performs the steps of: collecting, using a plurality of sensors of a sensor subsystem, information about an apparatus' immediate environment; fusing and interpreting, using at least one agent of the sensor subsystem, the collected information; receiving, at a plurality of models of a model subsystem, the collected information, wherein the plurality of models store other information; deducing, using the collected information and the stored other information and using at least one agent of the model subsystem, information about the apparatus' immediate environment; and carrying out, using a plurality of agents of an agency subsystem, plans according to goals identifying at least one desired outcome in relation to the apparatus' immediate environment, wherein the agency subsystem interacts with the sensor subsystem, model subsystem, and actuator subsystem; wherein the plans operate by invoking a plurality of skills, wherein each of the plurality of skills represents at least one behavior selected from the group consisting of: scripted behaviors, learned behaviors, and taught behaviors, wherein the skills invoke reflexes that interact with a plurality of actuators of an actuator subsystem, wherein the plurality of actuators interact with the environment.

A further aspect of the invention provides an apparatus, comprising: a plurality of subsystems that collect information about the apparatus' immediate environment and interact with the apparatus' immediate environment, wherein the plurality of subsystems comprise: a sensor subsystem comprising: i) at least one sensor that receives a stimulus from the apparatus' immediate environment, ii) at least one classifier that filters and identifies the stimulus, and iii) at least one sensor agent that selects and applies a classifier to the stimulus; an actuator subsystem comprising: i) an actuator that interacts with the apparatus' immediate environment based upon the classified stimulus and ii) at least one actuator agent that controls the actuator; a models subsystem comprising: i) at least one environment model comprising a representation of information associated with the apparatus' immediate environment based on the stimulus, ii) at least one being model comprising a representation of information associated with sentient beings, and iii) at least one apparatus model comprising a representation of information associated with the apparatus itself; and an agency subsystem comprising a plurality of agents, each agent being directed to a predetermined activity, wherein each agent carries out at least one plan to complete a desired outcome of the agent using at least one behavior selected from the group consisting of: a planned behavior, a learned behavior, and a taught behavior, wherein the agency subsystem interacts with the sensor subsystem, model subsystem, and actuator subsystem.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4A-4C illustrates an example use case for taking a person to a meeting.

DETAILED DESCRIPTION

Figure 1:
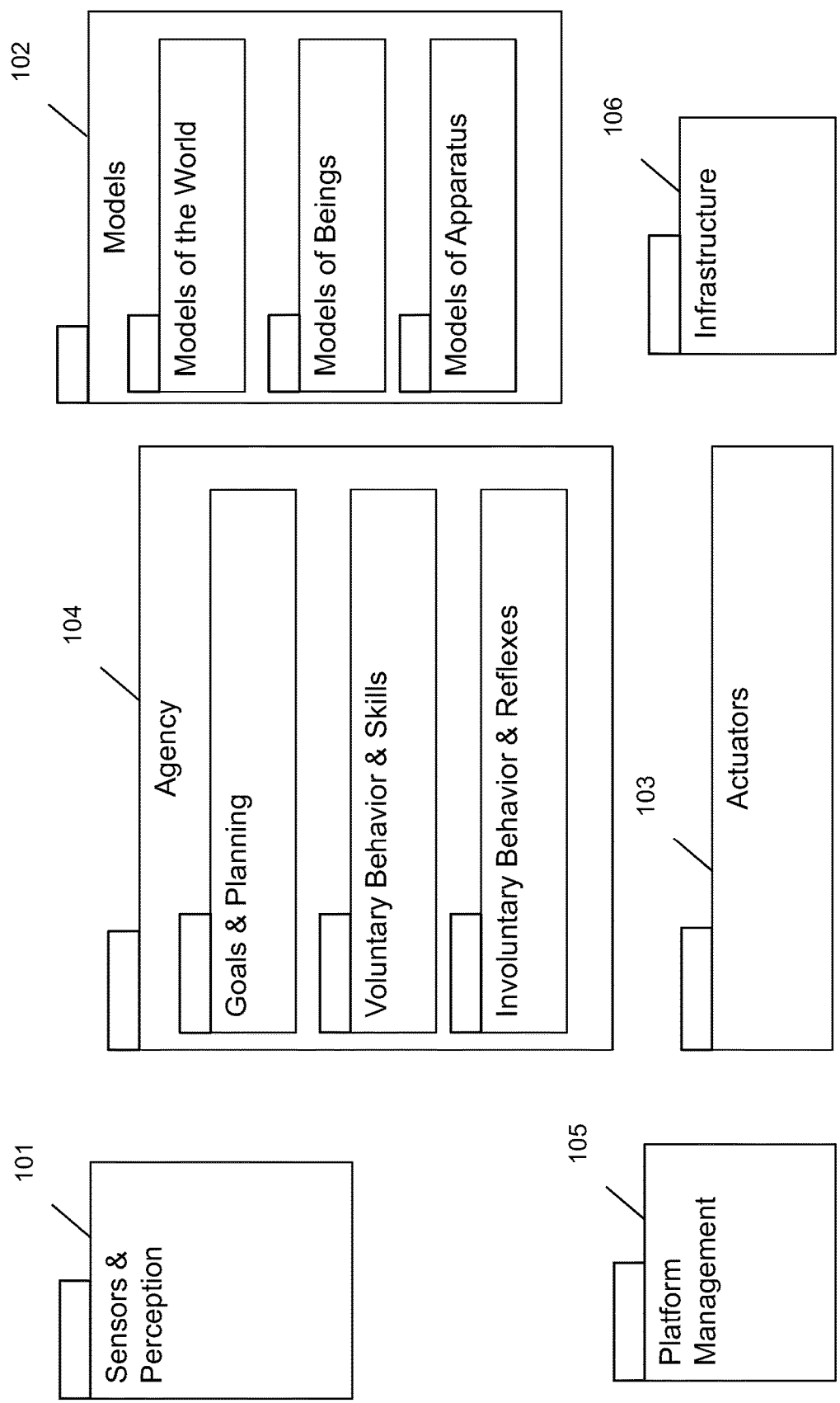
FIG. 1 illustrates an example architecture for an embodied cognition platform.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

A conventional system that allows for user interface and interaction is a virtual assistant or personal assistant, for example, SIRI® for APPLE®, ALEXA® for AMAZON®, CORTANA® for WINDOWS®, and the like. These systems allow a user to provide input, which the assistant analyzes and then provides an output. For example, users may ask the assistant a question which the assistant provides an answer to. As another example, a user may request the assistant to create a memo or document and dictate the contents of the document to the assistant which the assistant then transcribes and saves. However, these systems are largely request and respond architectures, meaning the user provides a request and the system responds accordingly to that request. These systems do not act without a direct request, do not reason and learn based upon learned past experiences, and generally do not function as a human being functions with learning and reasoning capabilities.

Figure 2:
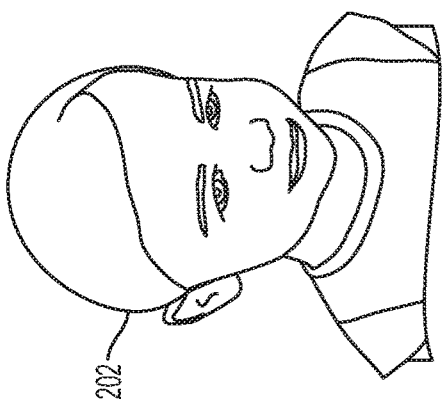
FIG. 2 illustrates example embodied cognition systems.
Figure 2:
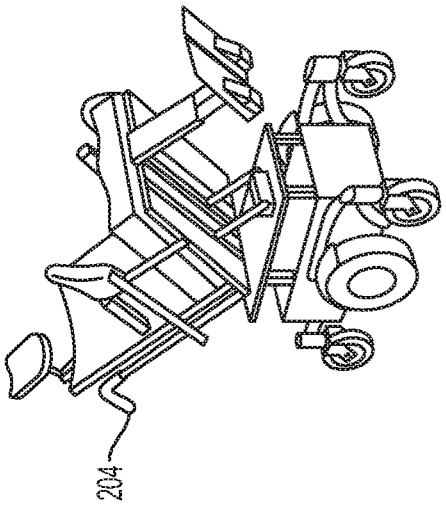
Figure 2:
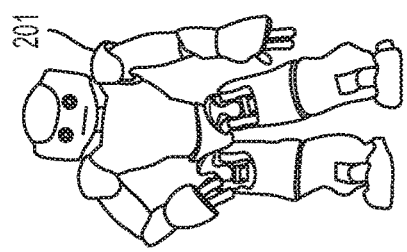
Figure 2:
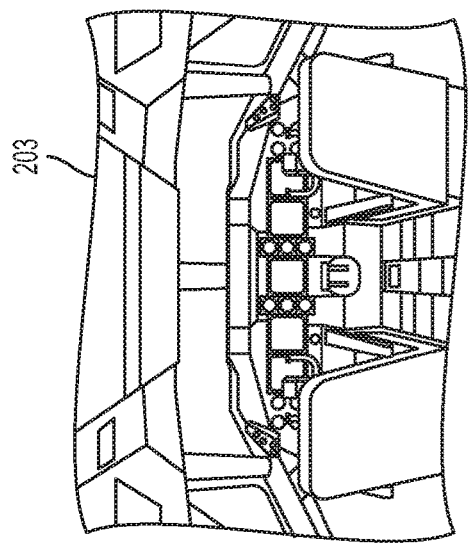

Accordingly, an embodiment provides a system which has cognition. Cognition includes high level constructs, for example, concepts, categories, and the like, and human performance on various cognitive tasks, for example, reasoning, judgment, and the like. In other words, the system as described herein has the ability to act without an explicit external request (i.e., the system has agency), has the ability to reason and learn (i.e., the behavior of the system is non-holonomic, meaning that it may behave differently in the future due to past learnings), and the system is in and of the world and represents a distinct "other" (i.e., the system has embodiment, meaning the system is a pseudo-sentient entity that has a theory of mind of itself and others). Thus, in contrast to the conventional systems, the embodied cognition system, as described herein, is in and of the physical world which gives the system a context for action, it reasons, it learns, and it has anthropomorphic identity. The system is associated with the establishment, planning, and execution of goals, which may require deductive, inductive, or abductive reasoning. The embodied cognition platform includes sensors that perceive the world or environment surrounding the platform, actuators that manipulate or influence the world, actors that react as well as bring agency to the world, and models that give the instantaneous and historical context of the world, others in the world, and the system itself. The embodied cognition platform may take a variety of forms, for example, as shown in FIG. 2, as a robot 201, an avatar 202, a space 203, an object 204, a device, and the like.

The system may be used in many different use cases which include augmented intelligence, for example, a basic cognitive assistant, concierge, retail assistant, elder care assistant, cooperative assistant, manufacturing assistant, cognitive companion, cognitive room, transportation assistant, and the like. In the different use cases, the system may coordinate conversational services with rich contextual models, interact with human actors, serve as a companion or helpmate, attend to processes or procedures, interact with other objects, and the like. As an example, an elder care assistant may be a cognitive assistant directed to the personal health and livelihood of a person in need of medical, mental, or social assistance. The elder care assistant may be as simple as a device that watches over a person and offers basic assistance, to a space that offers continuous monitoring and first responder help, to a collaboration of devices, avatars, and robots within a space that may also manage and dispense medication, prompt the human for activity, learn the person's common behavior and attend to deviations thereof, and the like. In addition, the system is designed to be extensible, meaning the essential kernel of the system remains (e.g., the subsystems, blackboards, etc.), but other components, for example, classifiers, agents, sensors, actuators, plans, skills, reflexes, individual models, and the like, can be replaced and added depending on the use case of the system. For example, a use case of a space may not include actuators for picking up objects, where a retail assistant use case may include such actuators.

Referring now to FIG. 1, the embodied cognition platform may include a variety of subsystems 101-106. The sensor subsystem 101 may include a plurality of sensors that collect information about an environment (e.g., the physical world, the surrounding environment, etc.). The sensors may include any device or object that can stream a sensor or receive a stimulus from the environment. Example sensors may include microphones, speakers, biometric sensors, temperature sensors, location sensors, movement sensors, and the like. The sensors may be used to capture text, speech, sound, video, optical, proximity, location, temperature, pressure, force, environmental, magnetic, and the like. The sensor subsystem may include a classifier which filters and analyzes the signal received from the sensor in order to identify and make sense of the sensor information. Examples of classifiers include natural language processing, facial recognition, object identification, glass break, chemical signature, and the like.

The sensor subsystem may also include at least one agent (called a perception agent herein for ease of understanding) that receives the signal. An agent, as described in connection with the sensor subsystem and also as described in connection with other subsystems, is a system that processes and fuses the information received from the subsystem. For example, an agent for the sensor subsystem processes, fuses, and otherwise manages the signals received from the sensor subsystem. An agent for the actuator subsystem, as described in more detail below, processes and fuses the activity for controlling the actuators and any information received from the actuators. An agent for the models subsystem, as described in more detail below, processes and fuses the information received from and obtained using the model subsystem and allow the system to reason with regard to the long-term state of the world, others in the world, and the system itself. The agency subsystem, as described in more detail below, includes all the agents that give rise to the essential behavior of the system encompassing the reactive as well as the autonomous behavior of agents that carry out plans in order to satisfy goals.

The perception agent may receive the signal by polling the sensors or sensor signal stream, the signal stream being connected to the agent, or any other method for receiving or obtaining the signal. The sensor subsystem may include more than one perception agent. As explained in more detail below, a single agent may be assigned to a single activity or task. Accordingly, the sensor subsystem may include more than one perception agent, where each perception agent is responsible for a particular type of signal or sensor, a particular grouping of signals or sensors (e.g., all the sensors for detecting movement, all the sensors associated with a particular part of the platform, all the sensors associated with a particular object, etc.), the signals or sensors for completing a particular activity, and the like. After receiving the signal, the perception agent may filter the signal and select and apply the appropriate classifier. As an example, the agent may identify the signal as being associated with a face. Accordingly, the agent may select a facial recognition classifier in order to determine if the face can be associated with a particular person. The perception agent may also fuse the signal or information returned by the classifier with other information, signals, or the like. The perception agent may post the processed information to a perception blackboard.

A blackboard may act as a device or mechanism for allowing inter-agent communications, not only between agents within a particular subsystem, but also between agents across different subsystems. A blackboard may include contextual information, for example, immediate context, recent context, historical context, and the like. The blackboard provides a device or mechanism for the posting of objects by agents. Objects may include any information regarding a system or subsystem that an agent is privy to or has processed for that system or subsystem. Objects may also be tagged with other information upon or subsequent to posting on the blackboard. Any agent, no matter what system or subsystem the agent is associated with, may subscribe to any blackboard. Upon subscription to a blackboard the subscribing agent will be notified when any new object is posted to the blackboard or when changes are made to objects on the blackboard.

Each blackboard may be associated with or correspond to a particular context or state of the platform or system. Thus, the agent(s) that may publish information or objects on a blackboard are the agents associated with or corresponding to the particular blackboard. For example, only a perception agent can post or change objects on the perception blackboard. The perception blackboard may represent the instantaneous and short-term perceptual situation or environment of the platform. Thus, the perception blackboard may codify the immediate and recent state of the entirety of what the platform or system senses. In other words, the perception blackboard may represent the sensual context of the platform or system.

The model subsystem 102 may include a plurality of models. Each model may be a representation of information, for example, a knowledge graph, database, file, markup, and the like. The models may be associated with different information. For example, the model subsystem may include models of the environment or the world, sentient beings or others, of the system or apparatus itself, and the like. A world or environment model may include information associated with the world or environment surrounding the system or apparatus. For example, if the platform is a robot in a retail store, the environment model may include information related to the space in and around the retail store. The information related to the space may include a representation of the surroundings, for example, a map, three-dimensional image, video image, three-dimensional point cloud, and the like, including information related to the surroundings (e.g., locations of doors, windows, elevators, stairs, etc.). The information may also include information related to non-sentient things in the space, for example, furniture, tools, products, and the like.

Depending on the use case of the apparatus, the world or environment model may include different information. Thus, the world or environment model may also include knowledge of the domain itself. For example, if the apparatus is being used as an elder care assistant, the apparatus may include information regarding different medications, care protocols, first response actions, and the like. As another example, if the apparatus is being used as a concierge, the apparatus may include information regarding surrounding attractions, hours of popular businesses, directions for getting to different locations, customer query response protocols, and the like. The world or environment model may include, but is not limited to, a representation of rules, constraints, values, common knowledge of the domain, and the like.

A being model or model of others includes information associated with sentient beings and non-sentient beings, for example, other instances of the platform or system. For example, a retail store may have a robot that greets people, a robot that assists customers, and a robot that entertains customers. Each of the robots (i.e., instances of the platform or system) may have information related to each of the other robots. A model of another may include information related to a theory of mind for each being, for example, the immediate and historical identity, goals, intents, values, emotional state, self-representation, and the like. The theory of mind is unique to and somewhat defines each being. The model also includes all the information known about the being which may be useful or relevant to the platform or system, for example, images, video, speech, conversational transcripts, biometric data, and the like. This information allows the platform or system to individualize or personalize its interactions with the particular being.

An apparatus or self model includes information about the platform or system itself. This type of model is similar to the being model, except the information is related to the apparatus itself. Such a model ensures the apparatus knows about the composition of this particular apparatus and its purpose. The apparatus model may include meta-knowledge of the sensors, actuators, actors, skills, plans, reflexes, models, and other information this platform or apparatus knows. This enables a degree of self-understanding, introspection, an ability of the system to know what it does not know, the presence of a persona, including a theory of mind, and the like.

The agent that may be associated with the model subsystem is an insight agent. As the models receive the information collected by the sensor subsystem, the agent(s) may deduce information about the environment in view of the collected information and the information previously stored in the model. The agent may analyze, fuse, refactor, or otherwise reason about models and collected information. The agent may post objects to the model blackboard, representing the instantaneous and short-term semantic situation of the platform or system. The model blackboard may codify the immediate and recent state of the entirety of what the platform knows, thus, representing the informational context of the apparatus or platform. As with the other agents, the insight agent can work across multiple models, may only work with a single object in a single model, or other such combinations.

The actuator subsystem 103 may include a plurality of actuators that interact with the environment. An actuator may include any object that acts within the world or environment. Example actuators may involve text, speech, sound, displays, movement, force, temperature, electrical action, mechanical action, chemical action, magnetic action, and the like. The actuator agent manages the actuator and the corresponding actuator signal. For example, the actuator agent may be responsible for filtering actuator signals, interpreting actuator signals, fusing actuator signals, and the like. The actuator agent may also be responsible for applying safety protocols to an actuator. For example, the domain or context of the apparatus may require an awareness of a force applied using an actuator. In other words, in the case of this example, the actuator agent may prevent the application of a force that may be dangerous in a given situation.

The agency subsystem 104 may include a plurality of agents. The agents are units of concurrent activity, meaning all operations take place within the context of an agent. Each platform or system may include many agents, many of which are active at the same time as other agents. Each agent may be responsible for a specific, tightly constrained predetermined activity. Accordingly, each platform or system may include hundreds or thousands of agents. Each agent may be programmed or designed for a specific activity. For example, a sensor agent may be responsible for a single sensor stream. Each agent may serve to carry out a predetermined goal or desired outcome. A goal may be asserted or generated from outside the system, for example, by a human actor, another platform or apparatus, and the like, or may be asserted or generated by the agency subsystem, for example, another agent within the system or platform, and the like. Accordingly, the system or platform is capable of self-agency or autonomous or semi-autonomous self-directed action.

To complete or accomplish a goal, the system may make a plan that is the declarative and operational expression of the one or more activities an agent carries out in pursuit of the goal. The plan may be in any form, for example, scripts, rules, programs generated around uncertainty, and the like. While pursuing a goal, an agent has the freedom to generate a new plan, select a plan taken from plan models, select a plan previously taken by the platform, or some combination of the foregoing. The plan models may not only catalog plans available to the present platform or apparatus, but may also catalog plans that are part of other instances of the platform or apparatus. As an example, the present platform may include a manufacturing robot for a specific product. Other instances of the platform may include other manufacturing robots or other apparatuses having similar instances. The plan chosen by the system may succeed or may fail. Upon success or failure, the operational knowledge of success or failure may be included as part of the plan.

Each plan may be the declaration or invocation of a sequence of skills or activities. A skill is a scripted, taught, or learned behavior of the platform which may invoke reflexes that interact with the plurality of actuators. A plan may encourage or inhibit a skill. A skill, in turn, may encourage or inhibit a reflex. A skill may be in a variety of forms, for example, scripts, rules, programs, machine learning models, and the like. The machine learning models are taught a priority and may continuously learn in the particular instance or platform. When formulating a plan, the agent will typically select a skill taken from models, similar to the plan models. Like with the plans, the skills may succeed or fail.

Each skill may be a behavior composed of reflexes. A reflex is a scripted, taught, or learned behavior of the platform or system as the lowest level of abstraction. A reflex may represent a closed loop behavior across actuators and sensors. A reflex may be a proxy for a primitive, built-in behavior of the apparatus and may be given direct access to sensors and actuators. Accordingly, the reflex may carry out closed-loop behavior that requires well-coordinated behavior with low-latency. The reflexes may be part of a reflex subsystem that transforms a set of higher order behavior into a reflexive behavior by pushing logic that directly connects the sensor subsystem to the actuator subsystem. The reflexes may be in a variety of forms, for example, rules, scripts, programs, proxies to primitives or machine learning models, and the like. When an agent formulates a plan, it will typically select a skill that in turn invokes reflexes.

A skill is an outwardly observable behavior. Skills represent atomic behaviors. Skill tends to require some level of thought. A reflex is a kind of skill that requires closed loop connections between sensors and actuators, because of a need of low latency and high performance. A reflex does not require much, if any, thought to perform the behavior. For example, putting a pin in a hole is a series of closed loop connections, and is thus a serious of reflexes. As the system is attempting to put a pin in a hole the sensors provide signals indicating how close the pin is to the hole. The system then adjusts the actuators to accommodate the sensor input without providing much thought into how the actuators are adjusted. In other words, as a person is putting the pin into the hole, the person will wiggle the pin in order to make it fit into the hole, without giving any thought on how much to wiggle the pin, which direction to wiggle the pin, and the like. The system as described herein can perform a similar technique with similar results as a set of reflexes. A plan is a sequence of skills that are used to achieve a goal. A plan involves a set of skills and reflexes to do something. Plans represent the selection of the skills. A goal is the naming of some desired outcome. Put together, a goal is the desired outcome, the plan is the set of steps and skills that achieves the goal, the skill is a particular atomic step and a reflex is special kind of skill.

The agents in the agency subsystem may post objects to an agency blackboard. The agency blackboard represents the instantaneous and short-term operational situation of the platform or system. A blackboard is device for inter-agent communication. A blackboard may include an abstract or virtual object for the different agents and/or subsystems to post or publish collected, deduced, or processed information. The agency blackboard may codify the immediate and recent state of the entirety of what the platform or system is doing, thus, representing the operational context of the platform or system.

The platform may also include two other subsystems, the platform management subsystem 105 and infrastructure subsystem 106. The infrastructure subsystem 106 is responsible for encapsulating all of the abstractions that are common to all other subsystems, such as agents, patterns, and the like. The platform management subsystem 105 may provide security to the other subsystems by attending to the authorization and security of a particular platform or subsystem. The platform management subsystem may also orchestrate the kernel of the platform that currently resides on the particular apparatus with all microservices, including their state particular to this platform. The kernel may include program code which is capable of executing on a platform. It may execute on bare hardware, on top of a resident operating system, or the like. The kernel implements the essential architectural elements of the platform, for example, the agents, blackboards, subsystems, and the like. Other logical components may manifest as microservices that may be stored on a storage device, for example, cloud storage, network storage, local device storage, and the like. As the system requires structures or behaviors, the desired structures or behaviors may migrate from the cloud. Conversely, information from the platform or system may migrate from the apparatus or platform to the cloud.

Figure 3A:
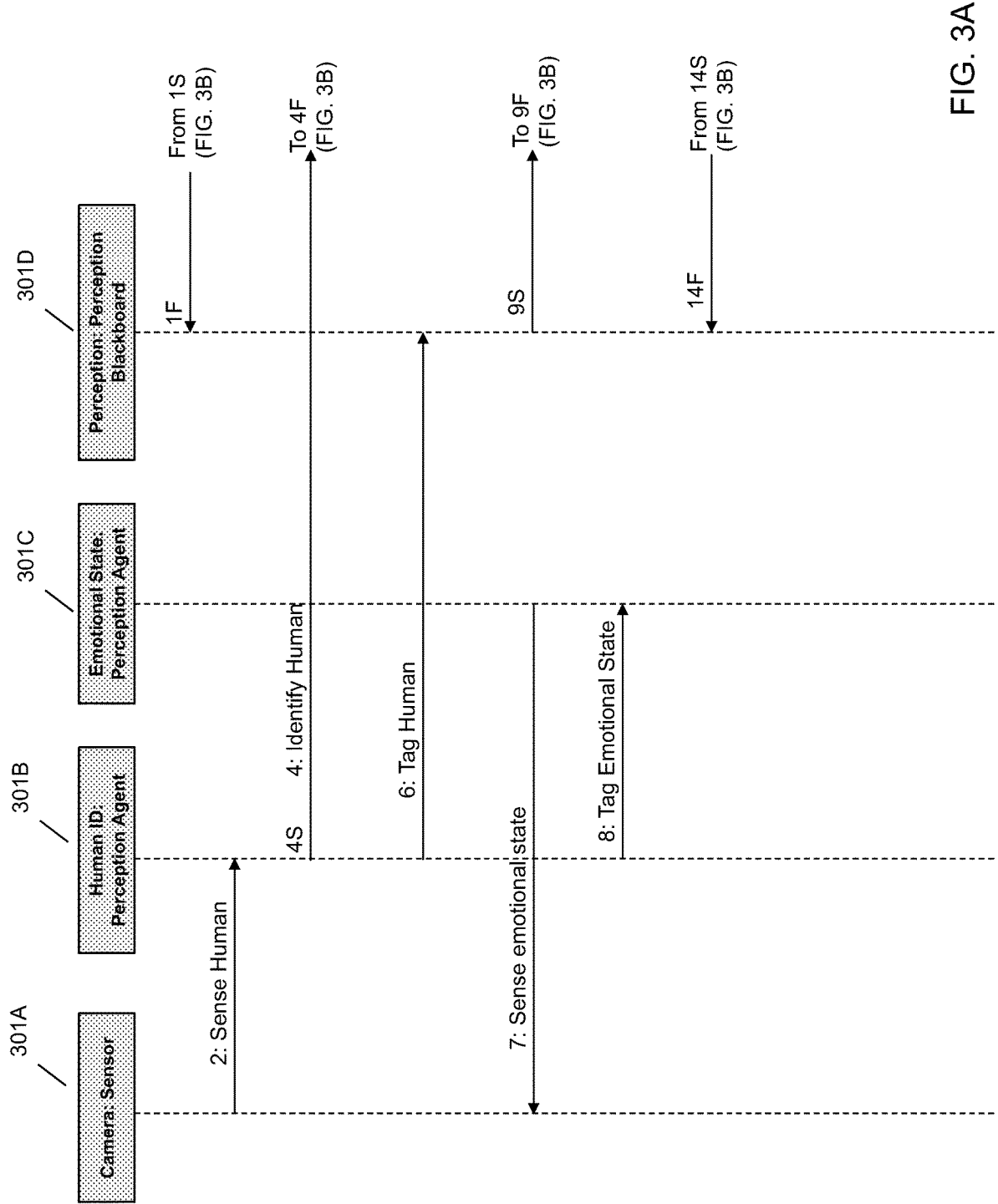
FIG. 3A-3C illustrates an example use case for accessing a conference room.
Figure 3B:
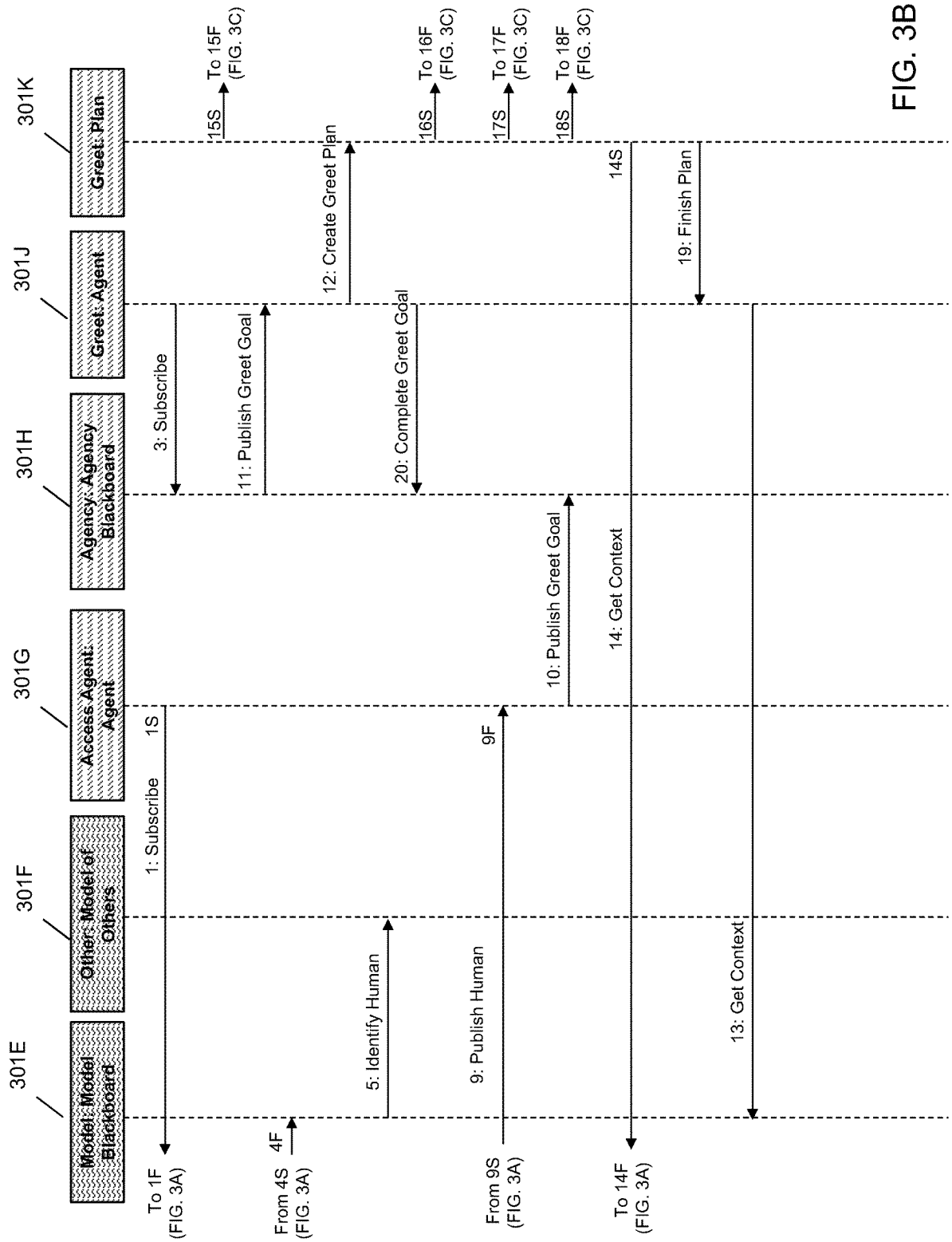
Figure 3C:
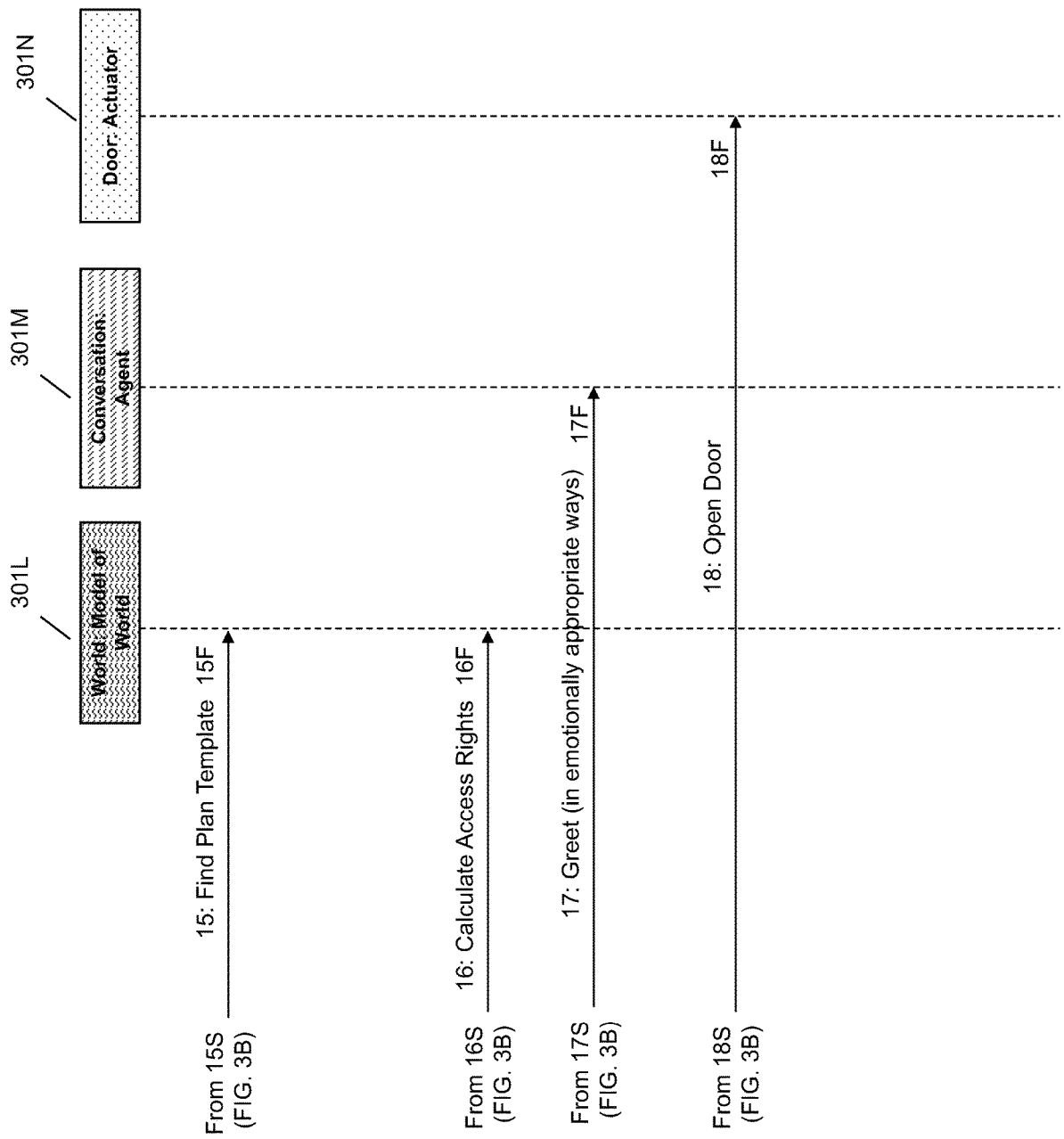

FIG. 3A-3C represents a sequence diagram for an example use case of accessing a conference room. Such a use case may occur when a person asks the system which may, for example, be in the form of a robot or concierge, to access a conference room. As an example, the robot or concierge may be standing guard at the conference room to greet people and verify that each person is allowed access to the conference room. Accordingly, for this use case, the established goal is to greet people and allow access to the conference room. Each of the different subsystem components 301A-301N (301I is purposely omitted for readability) necessary for completing the goal is shown at the top of the FIGs. Each of the different components belongs to a subsystem. The components belonging to the same subsystem are shown using the same shading technique. For example, components 301A-301D belong to the sensor subsystem, components 301E, 301F, and 301L belong to the model subsystem, components 301G-301K and 301M belong to the agency subsystem, and component 301N belongs to the actuator subsystem. As a walkthrough on how the system would analyze information to act with its environment to complete the desired goal, the system follows the steps as outlined in the sequence diagram.

First, the access agent 301G subscribes to the perception blackboard 301D. The system then senses a human using the camera 301A. This may be, for example, when a person walks up to the system and asks it to access the conference room. The greet agent 301J of the system then subscribes to the agency blackboard 301H. The perception agent 301B identifies the entity as a human and posts this information to the model blackboard 301E. The model blackboard 301E, at step 5, then identifies the human using the model of others 301F. The perception agent 301B tags the human and posts this information to the perception blackboard 301D. The perception agent 301C senses the emotional state of the human using the information from the camera sensor 301A. The perception agent 301B then tags the emotional state to the perception agent 301C. At step 9, the human published on the perception blackboard 301D is received by the agent 301G.

The agent 301G then publishes a greet goal to the agency blackboard 301H. The greet agent 301J receives the published greet goal from the agency blackboard 301H. The greet agent 301J, at step 12, then creates a greet plan 301K to carry out the greet goal. The greet agent 301J gets context from the model blackboard 301E. The greet plan 301K gets context from the perception blackboard 301D. To carry out the greet plan 301K, at step 15, a plan template for a greet plan is found from the model of the world 301L. Access rights are calculated using the model of the world 301L at step 16. Using the plan template and access rights, the system, using the conversation agent 301M, greets the human in an emotionally appropriate way. For example, if the human seems rushed, the robot may greet the human in a different manner than if the human seems relaxed. Similarly, if the human has a specific title or has been specifically identified, the system may greet the human differently than if the human is unknown or has a different title. At step 18, the system may open the conference room door, if the human has the correct access rights, using actuators 301N. At this point, the plan 301K notifies the agent 301J that the plan is finished. The agent 301J then completes the greet goal and publishes this completion to the agency blackboard 301H.

Figure 4A:
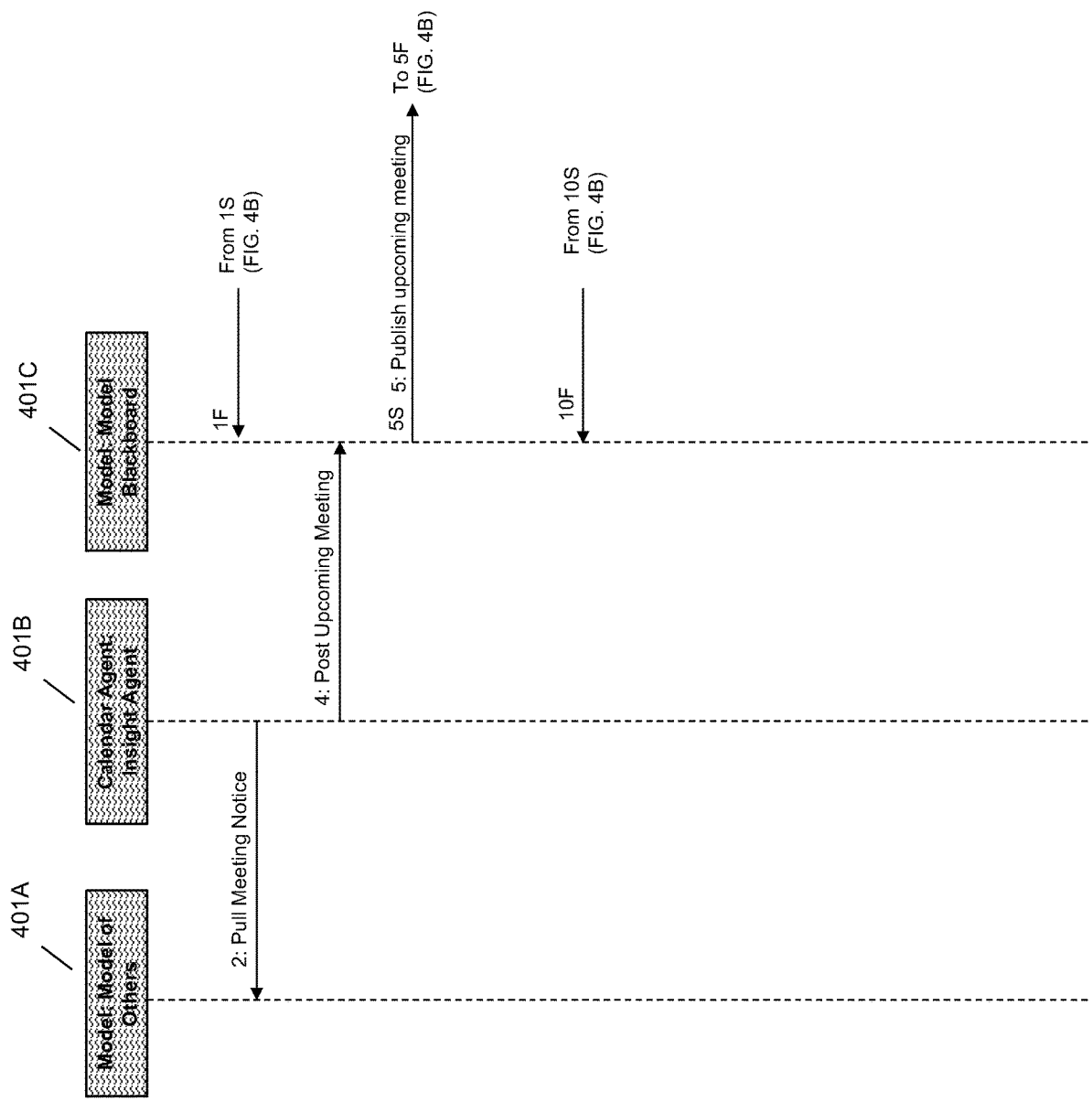
Figure 4B:
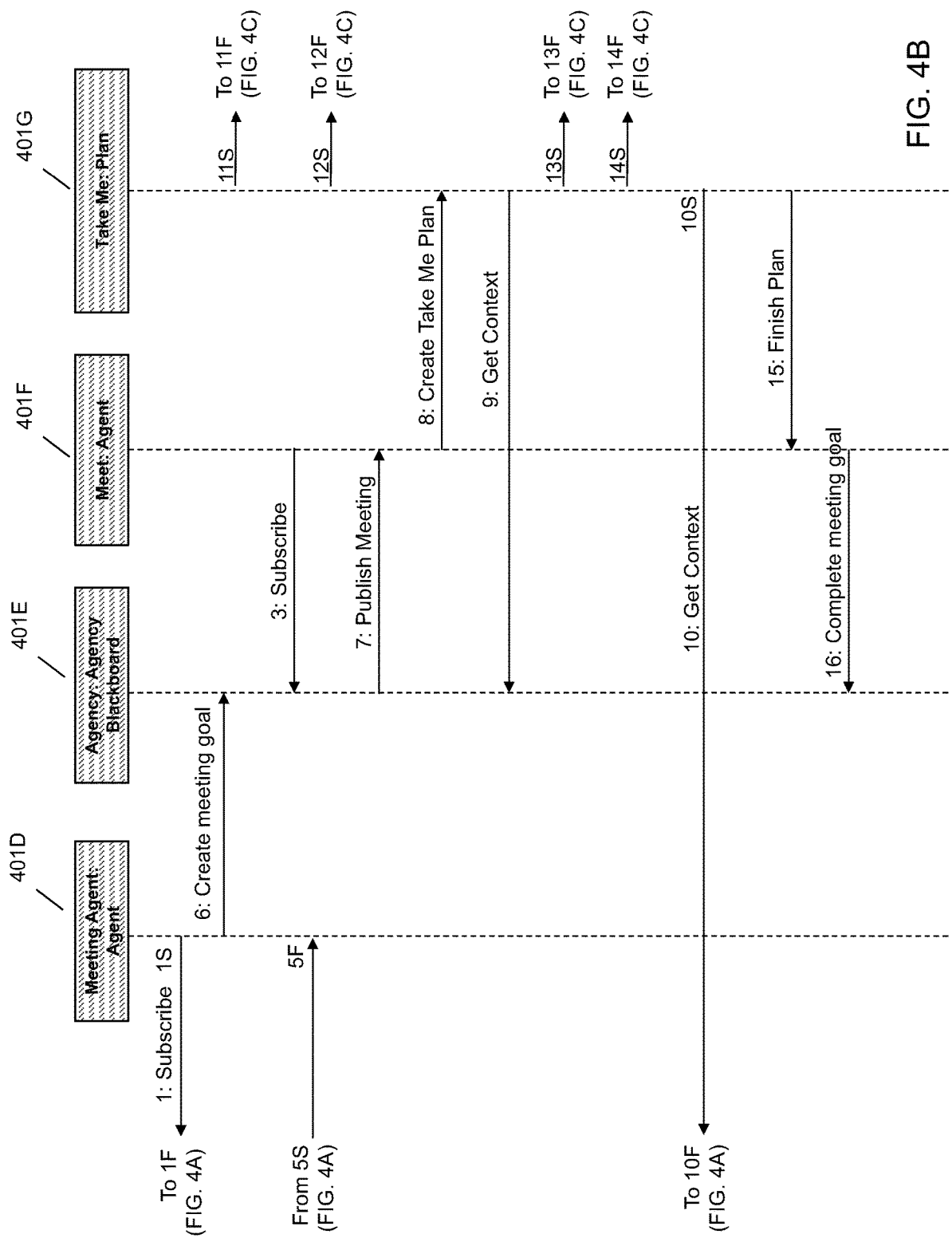

FIG. 4A-4C represents a sequence diagram for an example use case of taking a person to a meeting. Such a use case may occur when a person asks the system, for example, in the form of a robot or concierge, to take them to a meeting on the person's calendar. Accordingly, the overall goal for this use case is to take the person to the meeting. As described in connection with FIGS. 3A-3C, each of the components 401A-401K of the subsystems are shown at the top of the figures and are shaded in accordance with the corresponding subsystem. The shading as shown in FIGS. 4A-4C is consistent with the shading as shown in FIGS. 3A-3C. To summarize what is shown in the sequence diagram, the system may pull the meeting notice from the human's calendar, create a meeting goal, create a plan to carry out that goal, and complete the meeting goal.

Figure 5:
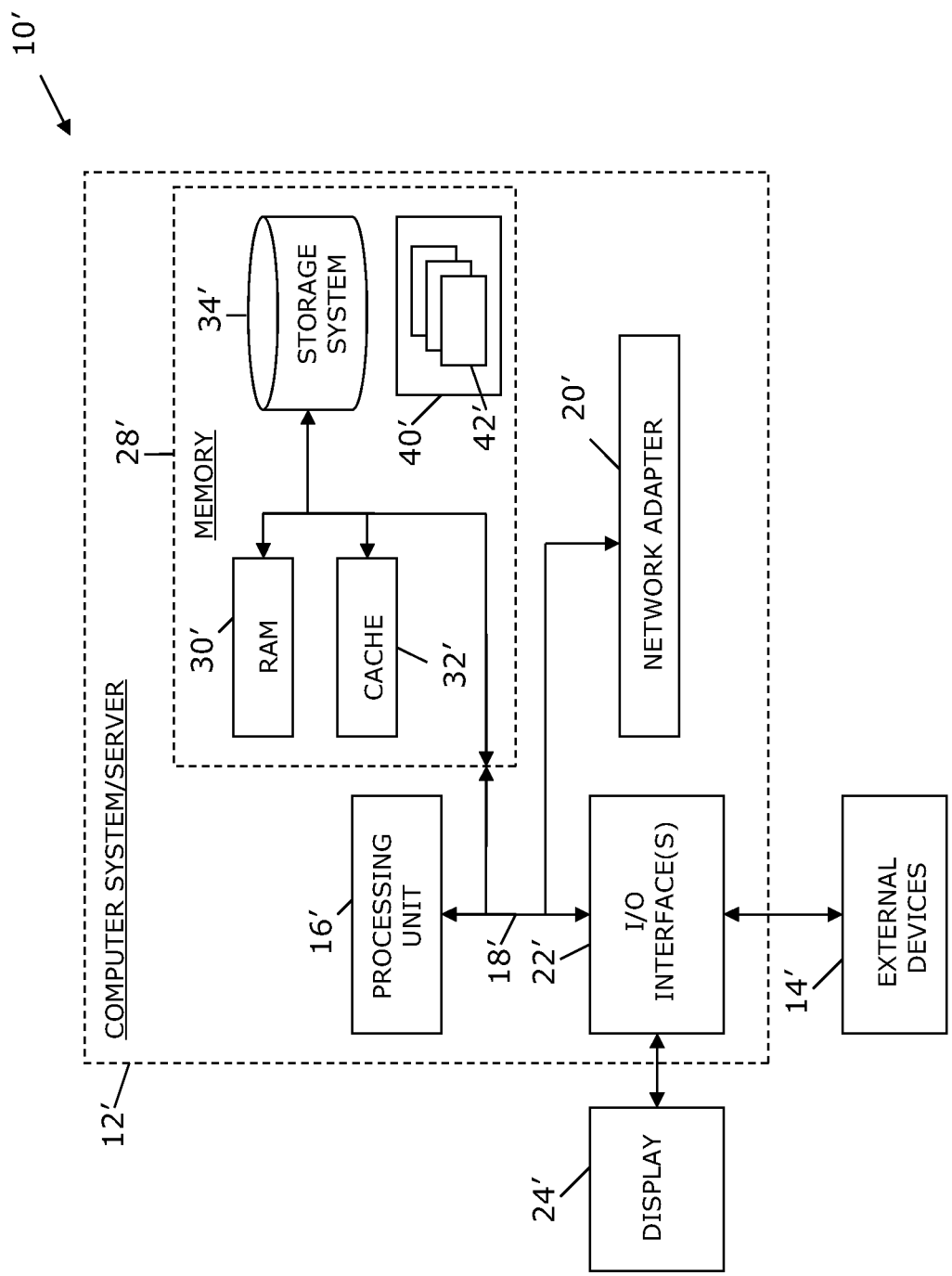
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A device, comprising:
a sensor subsystem comprising i) a plurality of sensors that collect information about an environment surrounding the device and ii) at least one perception agent that fuses and interprets the collected information;
a model subsystem comprising i) a model comprising a plurality of sub-models each comprising a representation of information for a focus of a given sub-model model, wherein the plurality of sub-models comprise at least one model for each of the environment, beings other than the device itself, and the device itself, the models receiving the collected information and storing other information, ii) at least one insight agent that uses the collected information and the stored other information from each of the plurality of models to deduce information about the environment, and iii) at least one model blackboard representing an informational context of the device, wherein the at least one insight agent posts objects to the model blackboard, the objects representing a semantic situation of the device as deduced, by the at least one insight agent, from the plurality of sub-models;
an actuator subsystem comprising a plurality of actuators that interact with the environment based upon the collected information and the information deduced by the model subsystem about the environment; and
an agency subsystem comprising a plurality of agents that carry out plans according to goals identifying at least one desired outcome in relation to the environment, wherein the agency subsystem interacts with the sensor subsystem, model subsystem, and actuator subsystem;
the plans operating by invoking a sequence of skills to achieve the goals, wherein each of the skills in the sequence represents at least one outwardly observable behavior selected from the group consisting of: scripted behaviors, learned behaviors, and taught behaviors, and wherein the skills invoke reflexes comprising a closed loop behavior interacting with the plurality of actuators.

2. The device of claim 1, wherein each of the plurality of agents publishes and subscribes to one another via a plurality of blackboards within an infrastructure.

3. The device of claim 2, wherein each of the blackboards comprises immediate context and recent context.

4. The device of claim 1, comprising platform management providing security to the subsystems.

5. The device of claim 1, wherein the sensor subsystem comprises a plurality of classifiers that filter and classify the collected information.

6. The device of claim 5, wherein the at least one fusion agent selects at least one of the plurality of classifiers and applies the at least one selected classifier to the collected information.

7. The device of claim 1, wherein the actuator subsystem comprises at least one actuator agent that filters and fuses signals from the plurality of actuators.

8. The device of claim 1, wherein each of the plurality of agents is directed to a predetermined activity.

9. The device of claim 1, wherein the goals are generated by the agency subsystem.

10. The device of claim 1, wherein at least one of the plurality of skills represents a machine learning model.

11. The device of claim 1, wherein a reflex comprises a built-in behavior of the device.

12. The device of claim 1, comprising a reflex subsystem that transforms a set of higher order behaviors into a reflexive behavior by directly connecting the sensor subsystem to the actuator subsystem.

13. The device of claim 1, comprising a system that replicates skills across all child instances of the device connected to the device.

14. A computer program product, comprising:
a computer readable storage medium having computer readable program code embodied therewith, the computer readable program code executable by a processor and comprising:
computer readable program code that collects, using a plurality of sensors of a sensor subsystem of a device, information about an environment of the device;
computer readable program code that fuses and interprets, using at least one perception agent of the sensor subsystem, the collected information;
computer readable program code that receives, at a plurality of sub-models of a model of a model subsystem of the device, the collected information, wherein the plurality of models store other information, wherein the plurality of sub-models comprise a representation of information for a focus of a given sub-model, wherein the plurality of sub-models comprise at least one model for each of the environment, beings other than the device itself, and the device itself;
computer readable program code that, using the collected information and the stored other information, deduces, using at least one insight agent of the model subsystem, information about the environment, wherein the at least one insight agent posts objects to a model blackboard of the model subsystem, the objects representing a semantic situation of the device as deduced, by the at least one insight agent, from the plurality of sub-models, wherein the model blackboard represents an informational context of the device; and
computer readable program code that carries out, using a plurality of agents of an agency subsystem of the device, plans according to goals identifying at least one desired outcome in relation to the environment, wherein the agency subsystem interacts with the sensor subsystem, the model subsystem, and an actuator subsystem of the device;
wherein the plans operate by invoking a plurality of skills, wherein each of the plurality of skills represents at least one behavior selected from the group consisting of: scripted behaviors, learned behaviors, and taught behaviors, wherein the skills invoke reflexes interacting with a plurality of actuators of the actuator subsystem, wherein the plurality of actuators interact with the environment.

15. A method, comprising:
utilizing at least one processor to execute computer code that performs the steps of:
collecting, using a plurality of sensors of a sensor subsystem of device, information about an environment of the device;
fusing and interpreting, using at least one perception agent of the sensor subsystem, the collected information;
receiving, at a plurality of sub-models of a model of a model subsystem of the device, the collected information, wherein the plurality of models store other information, wherein the plurality of sub-models comprise a representation of information for a focus of a given sub-model, wherein the plurality of sub-models comprise at least one model for each of the environment, beings other than the device itself, and the device itself;
deducing, using the collected information and the stored other information and using at least one insight agent of the model subsystem, information about the environment, wherein the at least one insight agent posts objects to a model blackboard of the model subsystem, the objects representing a semantic situation of the device as deduced, by the at least one insight agent, from the plurality of sub-models, wherein the model blackboard represents an informational context of the device; and
carrying out, using a plurality of agents of an agency subsystem of the device, plans according to goals identifying at least one desired outcome in relation to the environment, wherein the agency subsystem interacts with the sensor subsystem, the model subsystem, and an actuator subsystem of the device;
wherein the plans operate by invoking a plurality of skills, wherein each of the plurality of skills represents at least one behavior selected from the group consisting of: scripted behaviors, learned behaviors, and taught behaviors, wherein the skills invoke reflexes interacting with a plurality of actuators of the actuator subsystem, wherein the plurality of actuators interact with the environment.

16. The method of claim 15, comprising replicating at least some of the skills across all child instances of a parent instance.

17. The method of claim 15, comprising adapting one of the skills to a particular device based upon learning the capabilities of the particular device.

18. The method of claim 15, comprising each of the plurality of agents publishing and subscribing to one another via a plurality of blackboards within an infrastructure.

19. The method of claim 18, wherein each of the blackboards comprises immediate context and recent context.

20. A device, comprising:

a plurality of subsystems that collect information about an environment surrounding the device and interact with the environment, wherein the plurality of subsystems comprise:

a sensor subsystem comprising: i) at least one sensor that receives a stimulus from the environment, ii) at least one classifier that filters and identifies the stimulus, and iii) at least one sensor agent that selects and applies a classifier to the stimulus;

an actuator subsystem comprising: i) an actuator that interacts with the environment based upon the classified stimulus and ii) at least one actuator agent that controls the actuator;

a model subsystem comprising: i) at least one environment model comprising a representation of information collected from and associated with the environment based on the stimulus, ii) at least one being model comprising a representation of information collected from and associated with beings other than the device itself, iii) at least one device model comprising a representation of information collected from and associated with the device itself, iv) at least one insight agent that uses the information from each model of the model subsystem to deduce information about the environment and v) at least one model blackboard representing an informational context of the device, wherein the at least one insight agent posts objects to the model blackboard, the objects representing a semantic situation of the device as deduced, by the at least one insight agent, from each model of the model subsystem; and an agency subsystem comprising a plurality of agents, each agent being directed to a predetermined activity, wherein each agent carries out at least one plan to complete a desired outcome of the agent using at least one behavior selected from the group consisting of: a planned behavior, a learned behavior, and a taught behavior, wherein the agency subsystem interacts with the sensor subsystem, the model subsystem, and the actuator subsystem.

* * * * *